United States Patent Office 3,280,685
Patented Oct. 25, 1966

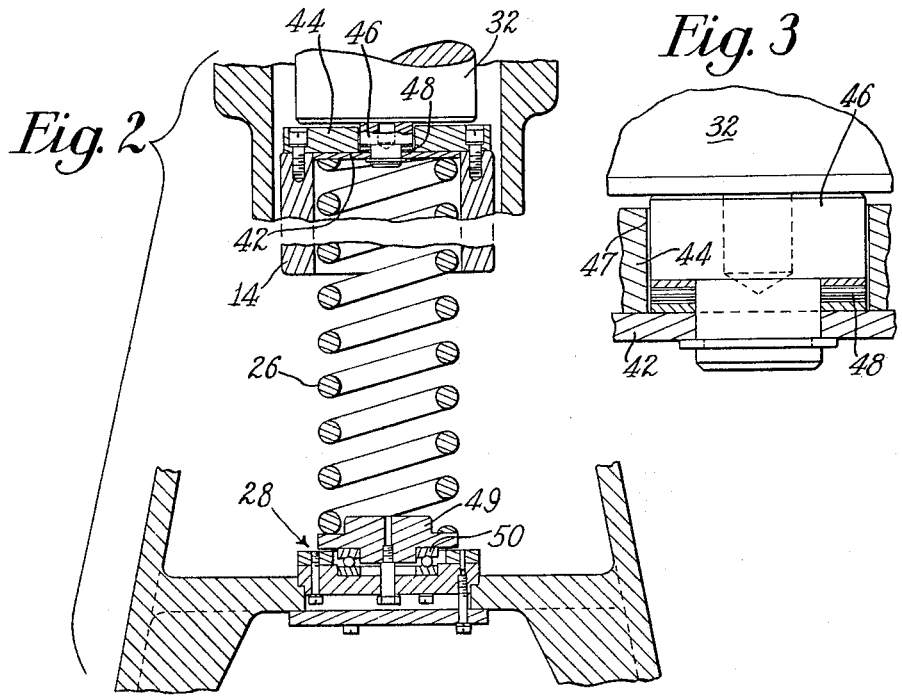
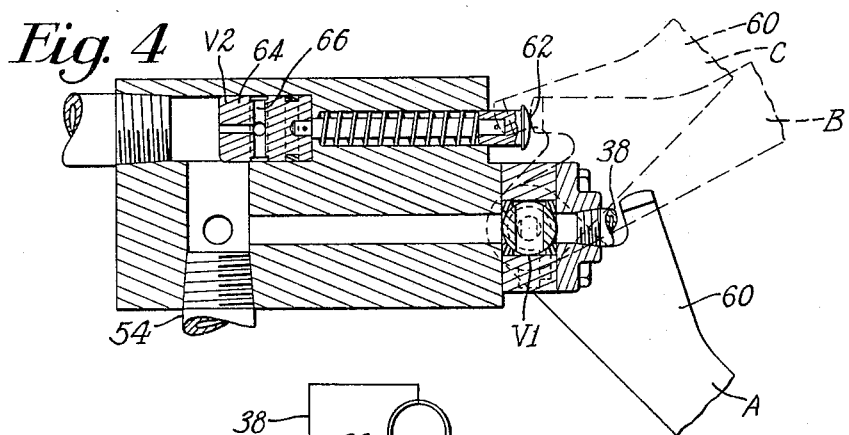
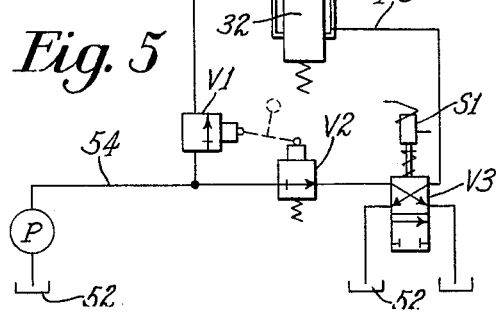

3,280,685
CUTTING PRESSES WITH CUTTER
STROKE ADJUSTMENT
Norman S. Derrah, Lynn, Raymond A. De Vita, Winchester, and Richard M. Elliott, Beverly, Mass., assignors to United Shoe Machinery Corporation, Flemington, N.J., a corporation of New Jersey
Filed Apr. 9, 1965, Ser. No. 446,925
2 Claims. (Cl. 83—533)

This invention relates generally to die cutting presses of the type known as clicking machines and has particular reference to hydraulic die cutting presses in which a movable press member in the form of a cantilever beam is mounted over a stationary support table. In such presses means is provided for driving the beam downwardly for example, by hydraulic pressure, to force a cutting die into a material such as leather, fabric, or the like disposed on the support table.

During the use of such a press, there is frequent need for the operator to adjust the rest position of the beam, that is, the normal height of the beam above the table prior to a cutting stroke, so that the beam, when swung over the table when a die is resting thereon on a work piece, will clear that die by a sufficient but not excessive margin. When there is a change from one set of dies to another set having a different height, an appropriate adjustment of the rest position is necessary.

To enable the operator to make such adjustments, a common expedient is to provide a threaded support member at the bottom of the post on which the beam is mounted, with a hand wheel disposed on the top of the post and suitably connected to the threaded member, so that the operator may raise and lower the beam by rotation of the hand wheel.

Adjustment of the beam height thereby requires upward or downward movement of the entire mass of the post and beam. Such adjustment is a time consuming and tedious operation which must be done frequently in the course of a work day, which greatly increases operator fatigue.

An object of this invention is to provide an improved clicking press of the type described in which power operated means is provided for adjusting the beam height.

A further object of the invention is to provide a hydraulically operated clicking press in which the source of hydraulic pressure for operating the press is utilized to adjust the height of the beam in relation to the table.

A further object of the invention is to provide a press of the type described in which the beam is so mounted as to reduce the swinging friction to a minimum.

Other objects of the invention will be apparent to one skilled in the art from the following detailed description of a specific embodiment taken in connection with the accompanying drawings in which FIG. 1 is a view in side elevation, partly in section, of a cutting press embodying the features of the invention;

FIG. 2 is an enlarged view in section of the portion of the beam support assembly at the upper and lower ends of the support spring;

FIG. 3 is an enlarged view of a portion of the upper end of the support beam and associated lower end of the piston;

FIG. 4 is a view in section of a hydraulic valve mechanism for adjusting the rest position of the beam; and FIG. 5 is a schematic diagram of the hydraulic system of the press disclosed herein.

Figure 1:
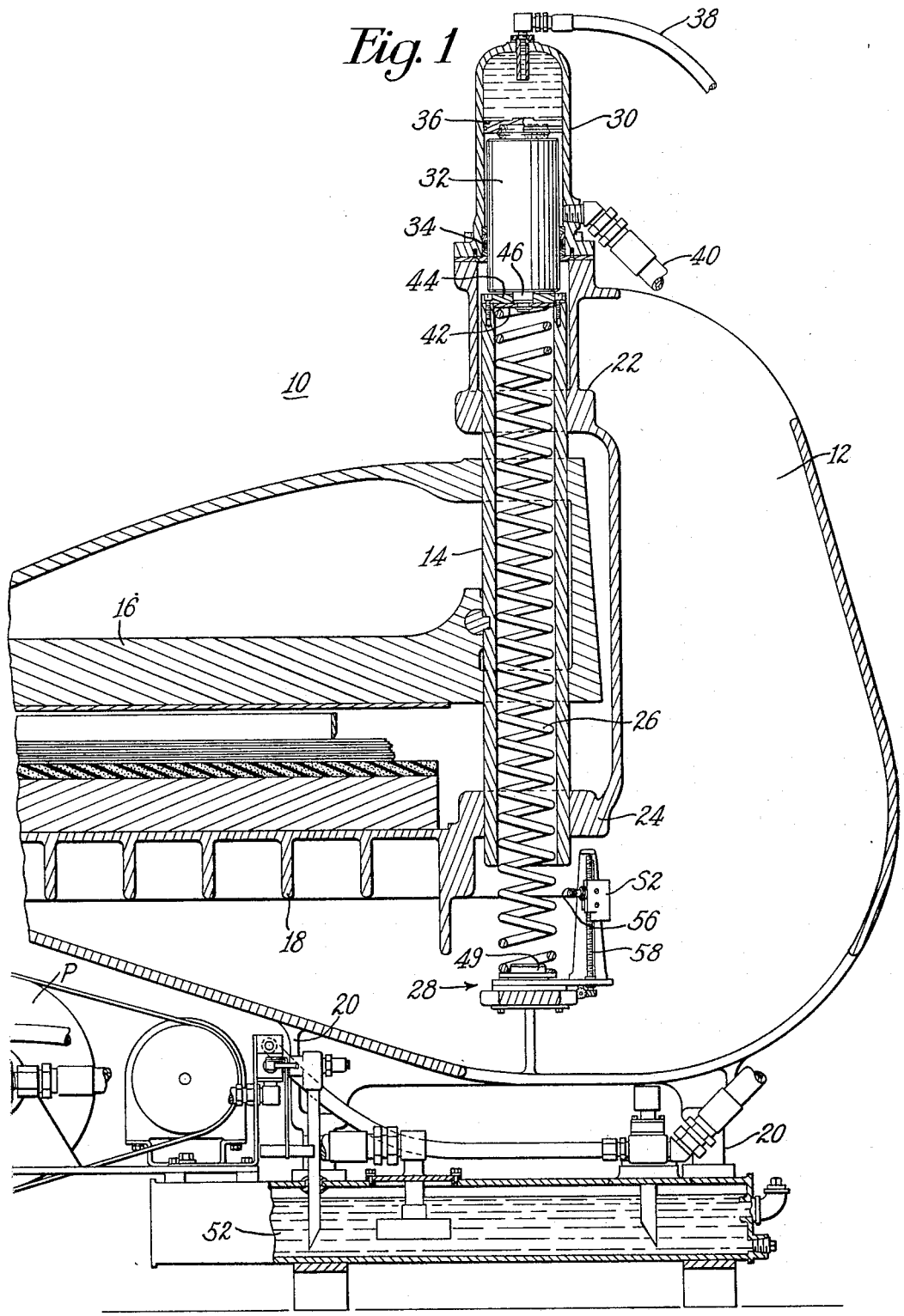

Referring to the drawings, there is illustrated a clicker machine 10 which comprises generally a C-frame 12 having a support post 14 mounted therein carrying a presser beam 16. The lower portion of the C-frame is formed into a work table 18 which projects horizontally from the post, with suitable support legs 20 extending downwardly therefrom.

The post 14 is mounted in upper and lower journals 22 and 24 for vertical sliding movement therein. To bias the post and beam into a upper position, the post 14 is provided with an internal support spring 26, the lower end of which rests on a suitable support 28 disposed within the C-frame.

The upper journal 22 is open at the upper end to receive thereon a hydraulic cylinder 30 which is open at the lower end, and contains a main piston 32 which rests on the upper end of the post 14 in a manner to appear hereinafter.

The cylinder 30 is provided with suitable internal packing 34 at the lower end to provide a fluid tight seal with the piston 32, said piston having a diameter slightly smaller than that of the upper portion of the cylinder for a purpose to appear hereinafter.

Disposed in the cylinder 30 above the main piston 32 is a beam positioning piston 36. The portion of the cylinder above the beam positioning cylinder 34 is connected by a hydraulic line 38 to hydraulic control means to be described hereinafter.

The space between the main piston and the cylinder is connected by means of hydraulic line 40 to hydraulic control means to be described hereinafter, said line 40 being connected to the cylinder at a point closely adjacent the lower end thereof for a purpose to appear hereinafter. The fact that the main piston 32 has a diameter slightly less than the diameter of the cylinder 30 allows pressure fluid from the line 40 to be applied to the top of the piston 32 as will appear hereinafter.

The upper end of the spring 26 bears against a plate 42, which normally rests against a cap member 44 secured to the upper end of the post. Retained in the center of the plate 42 is a plunger 46, the upper end of which is disposed in an aperture 47 in the cap, and normally projects a small distance above the upper surface thereof, bearing against the lower end of the piston 32. To permit free rotation of the cap 44 and plate 42 in relation to the plunger, a bearing assembly 48 is interposed between the plunger 46 and the plate 42 (see FIG. 3). The diameter of the upper portion of the plunger 46 is sufficiently less than that of the cap aperture 47 to prevent substantial rotational friction therebetween.

The posts and beam assembly is adapted to rotate freely in the journals 22 and 24, and the assembly disclosed herein has a number of features, now to be described, for reducing to a minimum the beam swinging friction.

Swinging of the beam necessarily causes rotation of the post 14. To permit the support spring 26 to rotate with the post, the support 28 comprises a plate 49 receiving the lower end of the spring, said plate resting on the upper race of a ball bearing 50 (see FIG. 2).

When the beam is in the rest position the plunger 46 is maintained in the uppermost position as illustrated in FIGS. 1–3 so that the piston 32 is held upwardly away from the cap 44. Hence when the beam is swung either toward or away from the cutting position by the operator, the cap 44 and the plate 42 can rotate freely with the post 14 and spring 26 about the plunger 46. Friction which would otherwise result from contact between the cap 44 and the piston 32 or from rotation of the piston 32 is thereby eliminated.

However, when the machine is operated to produce a cutting stroke by the application of fluid pressure to the cylinder 30 in a manner to appear hereinafter, the resulting downward movement of the piston depresses the plunger 46 so that the driving force of the piston is applied directly to the cap 44.

Referring now to FIGS. 4 and 5 there is illustrated respectively a hydraulic control valve mechanism and a schematic diagram of the hydraulic system of the illustrated machine.

The hydraulic system comprises a pump P which draws fluid from a sump 52 and supplies pressure fluid through a line 54 to a normally closed rotary valve V1 and through a normally open slide valve V2 to a solenoid valve V3. The valve V3 is normally positioned as illustrated so that the pressure fluid from the pump discharges to the sump.

To operate the machine, the operator energizes the solenoid valve V3 by means not shown to cause the valve to shift to the opposite position so that pressure fluid is applied through line 40 to the cylinder 30 between the main piston 32 and the positioning piston 36. The beam is thereby driven downwardly in a cutting stroke. The extent of downward movement of the beam may be controlled by a limit switch S2 having a control arm 56 projecting into the path of the post 14. The switch S2 and arm 56 are mounted on a threaded shaft 58 which is rotatable by any convenient means to adjust the height of the arm 56 in relation to the post.

The switch S2 is so interconnected by means not shown with the solenoid valve V3 as to cause the valve V3 to reverse to its original position when the arm 56 is actuated by the post 14 at the bottom of a cutting stroke. On such reversal the pressure is released from the cylinder 30, and the spring 26 raises the beam to its original rest position.

To provide for adjustment of the rest position of the beam, the rotary valve V1 is connected to line 38 leading to the top of the cylinder 30, and means now to be described is provided for admitting or releasing pressure fluid from the portion of the cylinder above the positioning piston 36.

The mechanism illustrated in FIG. 4 includes the rotary valve V1, slide valve V2, and an operating handle 60. The handle is normally in the position shown in full line in FIG. 4, indicated as position A, and when in said position, the slide valve V2 is open and the rotary valve V1 is closed, so that the press may be operated in the manner previously described.

To raise the rest position of the beam, the operating handle 60 is moved upwardly to position B, thereby opening rotary valve V1 and allowing fluid above the piston 36 to escape through line 38 and line 54 to the sump, under the force provided by the spring 26. (The pressure in line 54 at this time is substantially zero, since valve V3 is open to the sump.) When the beam has reached the desired height, the handle 60 may be returned to position A.

To lower the rest position of the beam, the operating handle is moved upwardly to position C so that the handle depresses a plunger 62 and moves the slider 64 of the valve V2 to the opposite position.

The slider of the valve V2 is provided with an orifice 66 so that even when the slider is in the fully closed position some pressure fluid can pass through the valve.

As the slide valve V2 is closed (the rotary valve V1 also now being open) pressure in line 54 increases to an amount great enough to overcome the pressure in the upper end of the cylinder 30 resulting from the upward force of the spring. Pressure fluid then enters through line 38, forcing the positioning piston, the main piston, and the beam downwardly. When the desired beam position is reached, the operating handle may be moved rapidly back to the normal position, thereby opening the slide valve V2 and closing rotary valve V1. The fluid admitted to the upper end of the cylinder is thereby retained therein, so that a new rest position of the beam is established. The above-described organization advantageously also provides a convenient means whereby the correct heightweise adjustment of the switch S2 may be determined for a given die. For such an adjustment, the die is placed on the cutting table and the beam 16 is run down at low pressure by suitable manipulation of the handle 60 until the beam rests on the die with a slight pressure. The switch S2 is then adjusted until it just closes at this heightwise position of the beam, suitably as indicated by a pilot lamp.

Since certain other obvious changes may be made in the device without departing from the scope of the invention, it is intended that all matter contained herein be interpreted in an illustrative and not a limiting sense.

We claim:

1. In a clicker press of the type described comprising a cutting table, a support extending upwardly alongside the table having upper and lower journals, a support post slidably disposed in the journals and carrying a presser beam, the combination therewith of means for effecting a cutting stroke of the beam, said means comprising a cylinder mounted on the upper journal, a piston in said cylinder positioned to cause downward movement of the post and beam on application of pressure fluid to the cylinder, means urging the post and beam upwardly, means for supplying to said cylinder pressure fluid at a given normal operating pressure for effecting a cutting stroke, and means for supplying to said cylinder pressure fluid at a variable predetermined pressure less than said normal operating pressure but sufficient for moving the beam downwardly whereby upon contact of the beam with a die positioned on the cutting table, the force on the die may be maintained at a value insufficient to cause substantial penetration of the cutting table by said die.

2. In a clicker press of the type described comprising a frame having upper and lower journals and a beam-carrying spindle mounted in the journals, spring means projecting upwardly into the spindle to bias the spindle and beam upwardly, support means for the spring, said support means being freely rotatable to permit free rotation of the spring with the rotation of the spindle, a cylinder mounted on the upper journal having a piston adapted to move downwardly when pressure fluid is applied to the cylinder to drive the spindle and beam downwardly, and a pivot plunger disposed in the top of the spindle and normally projecting upwardly therefrom against the piston to maintain the piston in spaced relation to the top of the spindle, said plunger having a diameter which is small in relation to the diameter of the spindle, and means biasing said plunger upwardly, said plunger being movable downwardly to permit the piston to bear directly against the spindle when pressure is applied to the cylinder.

References Cited by the Examiner
UNITED STATES PATENTS

| | | | |
|---|---|---|---|
| 1,070,729 | 8/1913 | Prime et al. | 83—534 |
| 1,081,751 | 12/1913 | Keats | 83—536 |
| 2,596,471 | 5/1952 | Densmore et al. | 91—167 |
| 2,666,123 | 1/1954 | Blackman | 83—639 |
| 2,760,569 | 8/1956 | Suerken | 83—639 |
| 3,153,965 | 10/1964 | Muhlback | 83—530 |
| 3,168,853 | 2/1965 | Prince | 92—13 |

WILLIAM W. DYER, JR., *Primary Examiner.*

L. B. TAYLOR, *Assistant Examiner.*